US010114362B2

(12) United States Patent
Langer

(10) Patent No.: US 10,114,362 B2
(45) Date of Patent: Oct. 30, 2018

(54) METHOD AND SYSTEM FOR CONTROLLING THE PRODUCTION PROCESS OF A PRODUCT

(71) Applicant: Christoph Langer, Norderstedt (DE)

(72) Inventor: Christoph Langer, Norderstedt (DE)

(*) Notice: Subject to any disclaimer, the term of this patent is extended or adjusted under 35 U.S.C. 154(b) by 279 days.

(21) Appl. No.: 14/907,459

(22) PCT Filed: Jul. 23, 2014

(86) PCT No.: PCT/EP2014/065854
§ 371 (c)(1),
(2) Date: Jan. 25, 2016

(87) PCT Pub. No.: WO2015/011207
PCT Pub. Date: Jan. 29, 2015

(65) Prior Publication Data
US 2016/0179082 A1    Jun. 23, 2016

(30) Foreign Application Priority Data
Jul. 25, 2013  (EP) .................................. 13178054

(51) Int. Cl.
*G05B 19/4069*    (2006.01)

(52) U.S. Cl.
CPC .............. *G05B 19/4069* (2013.01); *G05B 2219/40091* (2013.01)

(58) Field of Classification Search
CPC ................. G05B 19/4069; G05B 2219/40091
See application file for complete search history.

(56) References Cited

U.S. PATENT DOCUMENTS

| 5,101,363 A | 3/1992 | Rutkowski |
| 6,112,133 A * | 8/2000 | Fishman .......... G05B 19/40937 700/180 |
| 9,317,031 B2 * | 4/2016 | Hammann ....... G05B 19/40937 |

FOREIGN PATENT DOCUMENTS

| EP | 1189123 | 3/2002 |
| EP | 1320002 | 6/2003 |
| EP | 2254013 | 11/2010 |

OTHER PUBLICATIONS

W.P. Wang, et al., "Geometric Modeling for Swept Volume of Moving Solids", Computer Graphics and Applications, IDDD, vol. 6, Issue 12, Dec. 1986, pp. 8-17.

* cited by examiner

*Primary Examiner* — Charles Kasenge
(74) *Attorney, Agent, or Firm* — Jetter & Associates, P.A.

(57) ABSTRACT

A method for controlling production processes of products. A first n-tuple representative of current parameters of product are determined and stored. The current parameters are displayed. Control elements are displayed for selecting from pre-defined process actions compatible for performing on product having the current parameters retained in the first n-tuple. Each process action is representative of a first transformation matrix of dimension compatible with the first n-tuple. The pre-defined process actions and associated first transformation matrices are stored. A process action is selected from the pre-defined process actions. The first transformation matrix corresponding to the selected process action is applied to the first n-tuple to produce a second n-tuple of future product parameters. The product having the future parameters of the second n-tuple is displayed. Instructions are provided representative of the matrix elements in the first transformation matrix performing a process step on the product corresponding to the process action.

17 Claims, 8 Drawing Sheets

METHOD AND SYSTEM FOR CONTROLLING THE PRODUCTION PROCESS OF A PRODUCT

CROSS REFERENCE TO RELATED APPLICATIONS

This application claims the benefit of International Application No. PCT/EP2014/065854 filed on Jul. 23, 2014, which claims priority to EP App. No. 13178054.6 filed Jul. 25, 2013, which are each herein incorporated by reference in their entireties.

FIELD

Methods and systems for controlling the production process of a product.

BACKGROUND

In production processes and systems thereof, typically a starting material is firstly supplied to a manufacturing machine. A designer of the product designs the product via a computer system, using an application such as a computer-aided design (CAD) or computer-aided manufacturing (CAM) program. These programs offer a number of tools to design the product. After completion of the design of the product, a computer file is produced containing instructions for the manufacturing machine to execute. The manufacturing machine subsequently processes the instructions to create the desired product.

However, there are a number of shortcomings in this conventional process. Firstly, in these systems the starting material is restricted to specific default start pieces. The production process is under the assumption that the starting piece is one of these default pieces of fixed dimensions and the instructions control the manufacturing machine under these assumptions. If the operator decides to start with an unconventional starting work piece or with a piece whose manufacturing is only partly done, they must manually evoke changes to the manufacturing instructions. Generally, it is simply up to the operator to ensure that all manufacturing steps comply with the work piece and thus there is a large margin for error. Also, it typically requires the presence of a suitably trained operator or engineer to ensure correctness of the manufacturing process.

In this procedure, it is also necessary to complete all of the necessary steps from start to finish in one pass. A starting set work piece is simply an unprocessed block of material for which each feature of the product is crafted at the time of manufacturing. This restriction is quite limiting to how products can be manufactured, specifically where the spectrum of manufactured products is large and diverse.

Additionally, for a new user who is producing a product for the first time, it is a daunting task to determine and apply a subsequent appropriate manufacturing step for a given situation/work piece configuration. Therefore, it is required that users have a basic knowledge of how to operate the manufacturing process before they are able to effectively manufacture a product. This is a barrier that prevents many people from being able to quickly get involved in the production process of products. Conventionally, the suppliers or creators of the manufacturing systems would provide training and/or a help service to clients using the system. However, as with most processes involving the consultation of a specialist, this is an expensive and time-consuming solution.

Another problem with existing manufacturing systems is the restrictions they impose on the user. If a user desires to implement a feature not available by the manufacturing system, the user must work around the shortcomings using available manufacturing steps to patch together different features that would result in a similar outcome. This is a direct result of the typical way known controlled manufacturing systems may not allow a user to exceed pre-defined boundaries of their system.

Furthermore, the manufacturing machine simply follows the instructions generated during the design process, and there are no reliable means for checking whether the work piece is correct or not after every manufacturing step. If the operators would like to ensure that the work piece is as designed at every step of the manufacturing process, the operators must manually check themselves.

SUMMARY

Disclosed embodiments recognize there is a need in the field of process control for a more efficient and more flexible process which ensures accurate manufacturing of products, specifically in cases where there is a large diversity of products to be produced by a manufacturing system. Specifically, there is a need for a system allowing highly efficient production of individual products in a simplified environment so that the production process may be more economical. These needs are at least partially met by a disclosed method for controlling the production process of a product by a system being linked to a process control system controlling the system. The method can comprise the steps:

determining a first n-tuple representative of current parameters of the product by at least one input means of the process control system;

retaining the first n-tuple in a memory of the process control system;

displaying the product having the current parameters on a display device of the process control system;

displaying on the display device control elements for selecting from one or more pre-defined process actions that are compatible to be performed on the product having the current parameters as retained in the first n-tuple, each process action being representative of a first transformation matrix of a dimension that is compatible with the first n-tuple, the one or more pre-defined process actions and their corresponding first transformation matrices being retained in the memory of the process control system;

selecting one of the one or more pre-defined process actions;

applying the first transformation matrix corresponding to the selected process action to the first n-tuple to produce a second n-tuple of future parameters of the product and displaying the product having the future parameters of the second n-tuple on the display device of the process control system;

providing instructions representative of the matrix elements in the first transformation matrix of the selected process action to the system for performing a process step on the product corresponding to the process action; and repeating the above steps.

The input means can be any means by which the parameters of the product can be determined. In an embodiment, the input means may be a scanning sensor, specifically a 3D laser scanning device, and in another embodiment it may be a computer input component. The system as defined above is intended to represent any system or component that effects the changes to the parameters of the product, in a physical sense or virtual sense, depending on the nature of the product, i.e. tangible or not. Parameters in the present invention mean any feature of the product that can have an associated value. For example, a parameter may include the dimensions of the product, or the position of a feature of the product, but is not limited to these attributes. The process control system is the processing means for controlling this system.

An n-tuple refers to any data structure that holds n values in a structured and accessible manner. Similarly, the first transformation matrices are data structures that include a number of elements and that are compatible with the n-tuple to output a new preferably different n-tuple. The term compatible refers to the data structures having dimensions that can be applied to or combined with an n-tuple and which application or combination outputs a new, preferably different n-tuple, and wherein the elements of the new n-tuple have meaningful values within the limits and nature of the parameters defined for the product.

The elements of a transformation matrix for a specific process action are arranged such that each element defines the effect of the process action on a respective parameter of the n-tuple. For example, if a drilling action is selected, the associated first transformation matrix includes an element that would increase the value of the parameter of the n-tuple representing the hole depth and/or width when applied to the n-tuple.

The instructions sent to the system represent any form of signals or instructions that can be interpreted by the system to perform the selected process action.

In this manner, a more flexible and dynamic process is provided for producing a product. Since the current parameters of the product are initially detected, it allows any starting work piece to be supplied to the machine. For instance, an initial product that has been processed by another machine will have no problems being worked on by the present process since the parameters of the n-tuple are initially detected and appropriate "compatible" process actions offered. The compatibility between the parameters and the process actions parallels the compatibility of the underlying structures of the n-tuple and the first transformation matrices of the process actions. This relationship established between the production process and the actual product allows a more cohesive and accurate result.

Furthermore, by ensuring the compatibility of available process actions to the current parameters via the matrices of the process actions and the n-tuple representing the current parameters, the applicable process actions can be dynamically determined to be available to the user. In other words, process actions that are not compatible with the current parameters (i.e. n-tuple) are made unavailable.

In another embodiment of the present invention, the method further comprises, before or after displaying the product, applying a second transformation matrix to the first n-tuple to produce a q-tuple determining probability levels of each of the pre-defined process actions for application to a product having the current parameters as retained in the first n-tuple. The letter q indicates the number of pre-defined process actions. The control elements displayed on the display device are sorted according to the probability level of the corresponding pre-defined process actions defined in the q-tuple. Additionally, the second transformation matrix is retained in the memory of the process control system.

As with the first transformation matrices, the second transformation matrix is a data structure having elements arranged in dimensions so that when applied to the n-tuple will output a value for each process action stored in the system. The output values represents the probability of the corresponding process actions.

The probabilities may be explicitly displayed in percentages or indicated more broadly categorized under different categories, for example, "standard", "rare", etc. However, by maintaining the explicit probabilities, rather than simply the category, it is possible to define new categories and the recommendations will be dynamically re-categorized according to the new definitions set by a user.

This feature is especially helpful to new users of the process and system for manufacturing the product. By showing the probabilities of the process actions based on prior/common usage the user receives an indication of what process action is typically performed based on the current parameters of the product, i.e. n-tuple. Still though, other atypical process actions are not excluded from the user's availability.

Additionally, by using a transformation matrix to calculate the probabilities of process actions based on the current parameters, a dynamic way for determining the probabilities based on the current product state is achieved. As different process actions are used in certain situations more frequently, the second transformation matrix and specifically its corresponding elements are adapted to follow the trends. This allows the system to train itself and has proven to be consistently more useful than static probabilities, which however, may still have uses in systems employing the method of the invention.

In an embodiment of the invention, the displaying of the control elements may also include displaying on the display device a control element for adding a new process action, the new process action being representative of a new first transformation matrix of a dimension that is compatible with the first n-tuple and updating the one or more pre-defined process actions retained in the memory of the process control system to include the new process action and its new first transformation matrix. The second transformation matrix may be modified to include elements for indicating also the probability level of the new process action for application to a product having the current parameters as retained in the first n-tuple.

The process advantageously allows new process actions to be defined on the go, if an appropriate process action is not available by default. The process action is consequently stored in memory, has an associated probability which may be initially automatically assigned, and is henceforth available to the user and/or other users of corresponding production systems for future use.

This way, the system of the invention is continuously trained and expanded to include new hitherto unused process actions, wherein, optionally, by updating and applying the second transformation matrix process actions that are less or no longer used may over time be removed from the focus of the user or, in a specific embodiment, completely eliminated. This provides for an automatically optimized production system that "learns" new process actions and may "forget" no longer used ones without any interaction by the users or an administrator.

Accordingly, a system of the invention and its various embodiments renders the production process of a large spectrum of diverse products much simpler yet, at the same time, allows for accuracy and control of the production process. Also, the production process may be interrupted and re-started at any step in the production process without any loss of efficiency or scalability, thus rendering production much more flexible.

In another embodiment, the invention also allows the new process action to be added based on a pre-defined template of modifiable action steps. This renders the addition of new process actions simpler but at the same time allows a certain degree of control over the type, granularity and extent of process actions.

In a further embodiment, in the case where a new process action has been added but the second n-tuple still being identical to the first n-tuple, the second n-tuple may be modified to an n+m tuple, wherein m is representative of a number of new parameters added by or needing to be added in order to distinguish the new process action. If a proper selection of new parameters for the n+m tuple cannot be made automatically, which might further improve flexibility and transparency, the operator may be consulted for indication of such additional parameters. The first transformation matrices for each of the one or more pre-defined process actions and the second transformation matrix are consequently updated to be of a dimension that is compatible with the n+m tuple.

The system of the present invention is thus able to recognize when the n-tuple is insufficient to define the current parameters, which now have new parameters, and therefore the n-tuple must be expanded to include additional elements in order to sufficiently characterize the new parameters. Moreover, the transformation matrices of the system and their corresponding elements are updated when new parameters to the system are added in order to maintain the compatibility of the matrices with the new n-tuple.

In yet another embodiment, the step of displaying the control element may display on the display device a control element for deleting one of the pre-defined process actions. The one or more pre-defined process actions retained in the memory of the process control system is thereafter updated to remove the associated process action and its corresponding first transformation matrix, with the second transformation matrix also being modified to remove elements for indicating the probability level of the deleted process action for application to a product having the current parameters as retained in the first n-tuple.

In this way, process actions that may no longer be useful or relevant in the manufacturing process can be removed. This can serve to clean up the number of process actions presented to the user. As with the addition of new process actions, the system automatically and dynamically updates the relevant transformation matrices to account for the removed process actions.

In an embodiment of the present invention, pre-defined process actions with a probability level below a first threshold are not displayed and/or with a probability level below a second threshold are de-activated and/or with a probability level above a third threshold are activated and/or with a probability level above a fourth threshold are highlighted in the display of control elements for selecting from one or more pre-defined process actions.

Such feature is useful to display only relevant process actions to the user. For example, a probability level of 0% means that the process action cannot be performed and thus any process action below a threshold of e.g. 1% should be de-activated, i.e. a corresponding selection cannot be made. Similarly, a probability level below a threshold of e.g. 15% is quite unlikely and can be hidden from the list of available process actions in order not to clutter the list. An option is available to the user for showing these hidden process actions. Over time, probability levels of certain process actions may drop below the de-activation threshold which effectively means that the system seems to "forget" them as options in the production process of a certain product.

Once a process action is selected, the probability levels change to reflect the recommended process actions for the new set of current parameters. It is possible that a process action not previously possible and having a probability level of 0% would become possible with the new parameters. In this case, the process action should be activated when the probability level exceeds, for example, 0%.

On the other hand, process actions that are very likely can be recommended to the user. Process actions with a probability level that exceed the threshold of 80% are often used and should be emphasized to the user, by highlighting or other means of underlining this likely possibility.

The amounts that probability levels change over time, i.e. by the use of certain process actions in the course of the production process of the product, can be pre-defined. Also, dimension of the change can depend on the probability level from which one starts out, i.e. a process action having a probability level for a certain situation of 0% may, once manually selected from a "hidden" list, be set to 10%, 15%, 20% or 25% in one step, whereas a process action having a probability level of 80% may only increase in 0.1%, 0.25%, 0.5%, 0.75% or 1% steps or any other value upon selection thereof.

In another embodiment of the invention, one or more of the at least one process actions are recorded in a sequence for automatic execution thereof by the process control system.

This can be useful, if a series of process actions is very frequently performed in conjunction. For example, if a generic intermediate product is typically produced to serve as a basis for further distinguishing features, the steps to produce the generic intermediate product may be grouped into a sequence for automatic execution. This can also be another method for creating a new process action.

In a further embodiment, the process control system further comprises one or more additional input means for determining system-external conditions. Such external conditions may trigger automatic execution of the determination of the first n-tuple or the selection of one of the pre-defined process actions. Alternatively, the external conditions may trigger the termination of the process by the process control system. The process action taken is thus based on determination of a pre-defined external condition by the additional input means, which allows greater control over the system, for example, in highly automatized production environments with only few operator personnel.

In a still further embodiment, the system external condition is a timing condition. Other external conditions may, for example be based on input from a related system involved in the same manufacturing process, input from external peripherals directly or indirectly connected to the manufacturing system, and status of resources for functioning of the production system.

Determining the external conditions enables another layer of control to how the process should be performed. In an exemplary embodiment, the iterative process could be performed according to a certain time-interval.

In another embodiment, after the determination of the first n-tuple, the present invention may compare the first n-tuple with the second n-tuple of the previous iteration, wherein, if the first n-tuple differs from the second n-tuple, a pre-determined process action may be automatically selected and the subsequent steps additionally performed.

By making such a comparison, the present invention can perform supplementary and/or follow-up process actions automatically, however, only in certain situations or for certain production processes of certain products. If any discrepancies between the expected product and the manufactured product are detected, a pre-defined measure in the case of the discrepancy can be automatically taken. For example, if a hole of depth 10 mm is desired, and the additional input means determines the hole to be 9 mm, a drilling step may be further performed for 1 mm to create a hole of depth 10 mm. Alternatively, the process action can simply be a message to notify an operator of the discrepancy.

According to a further embodiment of the present invention, two or more process actions that are representative of identical transformation matrices are folded to one process action representative of one first transformation matrix. One or more redundant process actions are thereby removed, where the second transformation matrix is modified to remove the elements for indicating the probability level of the one or more redundant process action. The one or more pre-defined process actions retained in the memory of the process control system are updated to remove said one or more redundant process actions.

This feature is advantageous as it optimizes the operation of the process and system of the present invention. As a consequence of removing redundant operations, less memory is required for redundant entries of the matrices. These redundancies may arise due to the flexible nature of the invention, in which the user is free to define new process actions, e.g. when the user mistakenly adds a process action that already exists. By removing redundant process actions and corresponding first transformation matrices, the system is kept lean and excluding unnecessary information that may lead to confusion or error. Therefore, despite its flexibility, a system of the invention helps to improve the production process but retain the desired flexibility.

In an embodiment, the present invention may further log the first n-tuple, second n-tuple, first transformation matrix, second transformation matrix and/or probability levels of the one or more pre-defined process actions for each repetition of the steps of the present invention. Naturally, the process actions themselves may be logged as well. This allows for monitoring and quality control and may provide data to further enhance efficiency or accuracy of the production process.

In a further exemplary embodiment, the system is a simulation device of a production system. For example, the system can be a virtual machine representation of a physical system. All operations of the physical system can be accurately simulated in the virtual machine. In this way, it is possible to first simulate and optimize the manufacturing process of the product before the actual manufacture takes place. An example of such a system would be a virtualized computer environment provided by any available virtualization software, e.g. to produce something as a prototype (first virtual, then, when it leads to the desired result, real) and—based on the appliance method—repeat it on arbitrary machines, to come to the same result and, finally select the most efficient production process.

Another disclosed embodiment is directed to a process control system for controlling the production process of a product linked to a system and controlling said system, the process control system comprising:

an input device for determining a first n-tuple representative of current parameters of the product;

a memory for retaining the first n-tuple;

a display device for displaying the product having the current parameters, the display device displays control elements for selecting at least one selected process action from a plurality of pre-defined process actions that are compatible to be performed on the product having the current parameters as retained in the first n-tuple, each of the pre-defined process actions being representative of a first transformation matrix having matrix elements of a dimension that is compatible with the first n-tuple, the process action and their corresponding first transformation matrices being retained in the memory of the process control system;

a matrix application device for applying the first transformation matrix corresponding to the selected process action to the first n-tuple to produce a second n-tuple of future parameters of the product and displaying the product having the future parameters of the second n-tuple on the display device of the process control system; and a device for providing instructions representative of the matrix elements in the first transformation matrix of the selected process action to the system for performing a process step on the product corresponding to the process action.

Disclosed embodiments includes any reasonable combination of the above embodiments. The skilled person understands that any of the embodiments disclosed above may be supplemented by the features or a subset of the features of any other embodiment. An exemplary embodiment of the present invention, which is not understood to be limiting in any way will next be discussed with reference to the figures of the present application below.

BRIEF DESCRIPTION OF THE DRAWINGS

Reference will now be made to the accompanying drawings, which are not necessarily drawn to scale, wherein.

DETAILED DESCRIPTION

The following description describes an exemplary process control system embodiment to illustrate realization as a concrete embodiment. It is not intended to limit the scope of the present invention. Same reference numbers in the figures indicate same elements.

Figure 1:
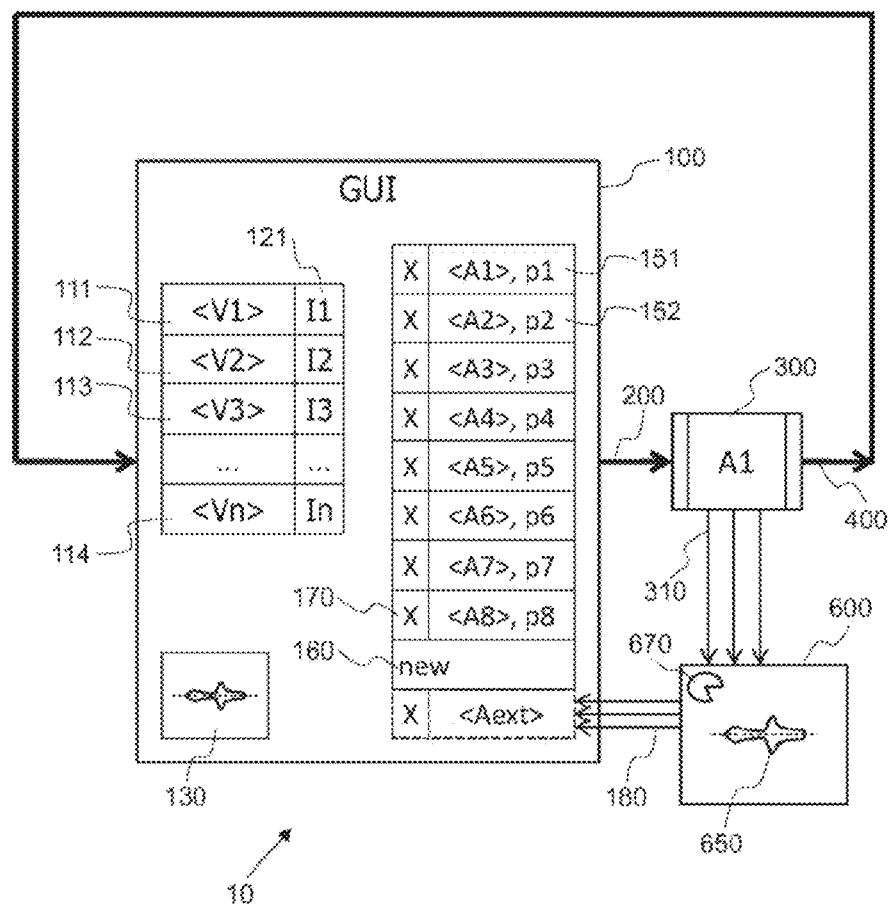
FIG. 1 shows a schematic view of a production system according to an embodiment of the invention, including a graphical user interface of a process control system.

FIG. 1 depicts an example process control system 10. The process control system 10 includes a system 600 for manufacturing a product 650. The system 600 is in communication with a display device 100 and an interface component 300. The system 600 includes a sensor 670 for determining parameters of the product 650. The determined parameters are provided to the display device 100 as external signals 180. Based on such signals, a display 130 of the tool can be displayed to the user. A user refers to anyone using, modifying, supervising or otherwise working with the process control system 10. One or more of the actual determined parameters V1 to Vn displayed in elements 111 to 114 can also be explicitly listed in the display device 100. Thus, the tool has an n-tuple of current parameters. Associated icons I1 to In for these parameters, as shown in element 121, may also be displayed.

A novel aspect of the present invention is the way the system keeps track of the product 650. In the invention, and for the purposes of this specification, a "situation" is the state of the product or the work piece before and or after individual process steps and encompasses all the features of the product at a given point in time. Thus, at any point in time, the product will be represented by a specific situation. The situation is defined by the n-tuple representing current parameters of the product. Essentially, all of the features of the method and system of the present invention are reliant on the particular situation of the product 650 that governs how the system 10 is to behave.

Based on the parameters V1 to Vn of the current situation, the system 10 can then provide the user with a list of possible process actions A1 to A8 that can be performed on the tool 650. Preferably, each of the listed options A1 to A8 will have an associated probability p1 to p8. Importantly, the available process actions and the associated probabilities are entirely dependent on the current situation of the tool 650. As the tool 650 is modified and the user interacts with the system, the list of process actions and probabilities are dynamically changed.

Selection of a control element 151, 152 corresponding to the process actions A1 to A8 will direct the selected process action 200 to the interface component 300. In FIG. 1, the process action A1 is chosen and provided to the interface component 300. The interface component 300 then ensures that appropriate instructions be provided to the system 600 via signals or instructions 310. The format of the signals or instructions would be dependent upon what input the system 600 can interpret.

It is within the scope of the invention that the interface component 300 may be part of the display device 100 or the system 600. It is also noted that the system 600 may be one or more manufacturing system or even a simulation device, e.g., virtual machine representation, of the physical manufacturing system.

While not shown in FIG. 1, the system 10 also retains in memory a first transformation matrix for each of the existing process actions. These matrices represent the changes that will be applied to the tool 650 and more specifically how the current parameters will be modified. Once a process action is selected, the matrix corresponding to the process action will be applied to the n-tuple of current parameters producing a new n-tuple of future parameters, i.e., what the parameters of the tool 650 will become once the process action is performed. This new n-tuple can be used, for example, to confirm whether the tool after the process action is performed is correct.

A transformation matrix of a second type is also maintained for calculating the probability levels of taking the listed process actions. This second transformation matrix when applied to the n-tuple of parameters of the tool 650 outputs a q-tuple that represents the probability of each of the process actions being taken given the current parameters. Naturally, q is the number of process actions. Utilizing this second transformation matrix, the probability of each process action changes as the current parameters change, and dynamic probabilities for each process action are thus provided.

An example of an implementation of the second transformation matrix would be to employ a tracking counter for each process action given a distinctive situation. Whenever a process action is selected under the distinctive situation, the tracking counter for that process action is increased. The next time the product arrives at the distinctive situation, the system 10 determines from the second transformation matrix the tracking counters which are associated with the distinctive situation. Each of these tracking counters determined are enumerated to output the probability of the process action being performed for the distinctive situation. In this manner, the probability levels of the process actions are dynamically updated based on the selection of the process actions in previous iterations. It is understood that while the tracking counters could be initially empty, it could also be pre-populated based on known system data or data retrieved from other systems or external sources.

While the second transformation matrix is typically automatically calibrated by the usage of the process control system 10, as described above, the present invention also allows the user to manually set the probability level. This probability can be trained as above or it may be a fixed probability level that will not be updated by the system 10 via usage. Additionally, the user can customize what process actions are available for a given situation regardless of the probability. For example, a user can set a process action to always be displayed regardless of whether the probability level is high or low.

Numeral 400 of FIG. 1 represents the transition from a current situation with the current parameters to the next situation of future parameters (which would then become the current parameters in the next step). This next situation may be either one that is already known to the system, or one that is new to the system. As mentioned, the first matrix of the selected process action is applied to the n-tuple to produce a new n-tuple representing the parameters of the tool 650 in the next situation. It is envisioned that the system could provide a preview of the tool 650 in the next situation in display 130 for the user before selection is confirmed.

In the case that the user notices a process action that is not appropriate for the tool 650 in the current situation, they may choose to delete the process action by clicking the control element denoted by 170. Conversely, if the user cannot find an existing process action suitable for their needs, they may select the control element 160 to define a new process action. As can be appreciated, the matrix associated with the deleted/newly added process action will be removed/created in response. The second transformation matrix will also be updated to remove or add entries representing the deleted/added process action.

Additionally, as previously mentioned, the probability levels of the available process actions are adjusted based on its usage. Once a process action has been selected, the entries of the second transformation matrix are updated so that the probability level of the selected process action is increased and the probability levels of all other process actions are decreased.

The changes to the n-tuple, new n-tuple, transformation matrices for each process action, second transformation matrix and/or the probability levels of the process actions may be logged by the system 10. This information may be analysed at a later time or used to trace back a series of process actions.

Some of these above-mentioned processes will be explained in more detail below with respect to FIGS. 2 to 8.

The above-described system may be used in a process for controlling the manufacture of a diamond grinding tool, for example. We will explain the operation of this system in FIGS. 2 to 8 under such an example for the purpose of providing a concrete illustration. However, any other process control system 10, system 600 or product 650, or simulations thereof which can operate following the described procedures are within the scope of the present invention.

Figure 2:
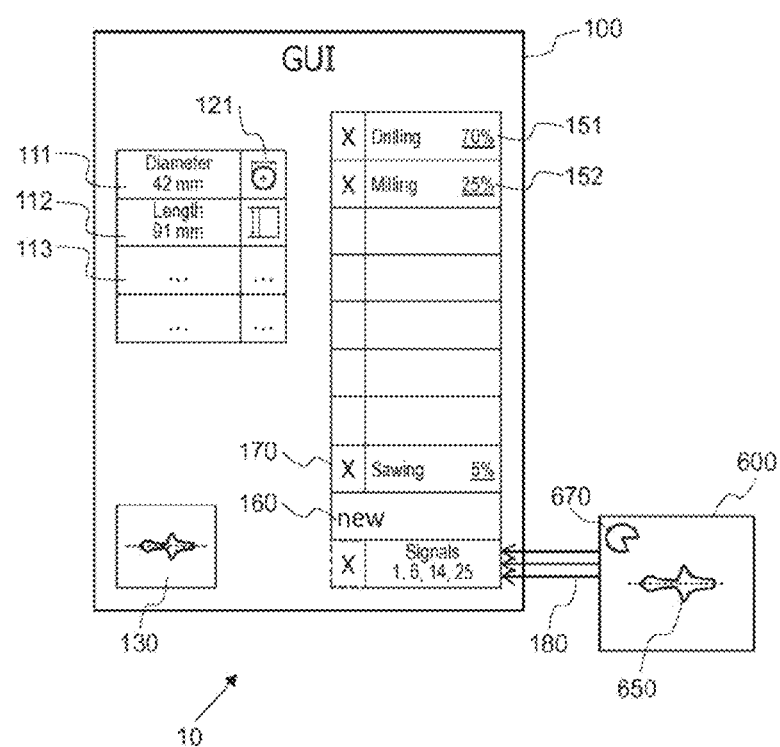
FIG. 2 shows a schematic view of an embodiment of the invention when determining the first n-tuple.

As shown in FIG. 2, the starting work piece of the diamond grinding tool 650 is provided to the manufacturing system 600 which will perform the manufacturing operations on the tool 650. Once placed therein, the sensor 670 scans the tool 650 to obtain, for example, its dimensions, contour and other parameters. The sensed information 180 is then provided to the display device 100 as signals 1, 6, 14 and 25 that provides a display 130 of the current situation of the tool 650 to the user. In this manner, the user can control the manufacture of a tool in the manufacturing system 600. The user can be remote from the manufacturing factory where the manufacturing system 600 is located.

The information of the current parameters 111 to 113 of the tool 650 is stored in memory of the system 10 (now shown) and displayed to the user. The name and value of the parameters in this example are represented in FIG. 2 as Diameter 111 having the value of 42 mm and the length 112 having the value of 91 mm. As can be seen, there may also be provided a visual indication 121 of the parameters. This can aid understanding of a parameter if the name is not easily comprehensible from the name of the parameter solely.

In order to enable the user to select process actions to be performed on the tool 650, the system 10 provides a number of control elements 151, 152 each representing a process action. For each of these process actions, the system 10 calculates a probability level based on the current situation and the second transformation matrix stored in the system 10 as discussed previously.

In FIG. 2, three process actions are shown with the respective probability levels: Drilling (70%), Milling (25%) and Sawing (5%). In a preferred embodiment, the control elements 151, 152 are sorted according to the probability of their respective process actions. In this figure, the control elements 151, 152 are listed from the highest to lowest (i.e., decreasing manner). Since the probability level of the Sawing action is significantly lower than the other process actions, it is separated away from the more likely process actions. Other possible methods for handling low probability process actions would be to disable it or hide it from the user by default if they fall under a "disable threshold" or a "hide threshold", respectively. Similarly, process actions with high probability levels exceeding a certain threshold could be emphasized by highlighting the associated control element in addition/alternative to listing the process action on top or re-enabling a process action after it has fallen out of favour.

Figure 3:
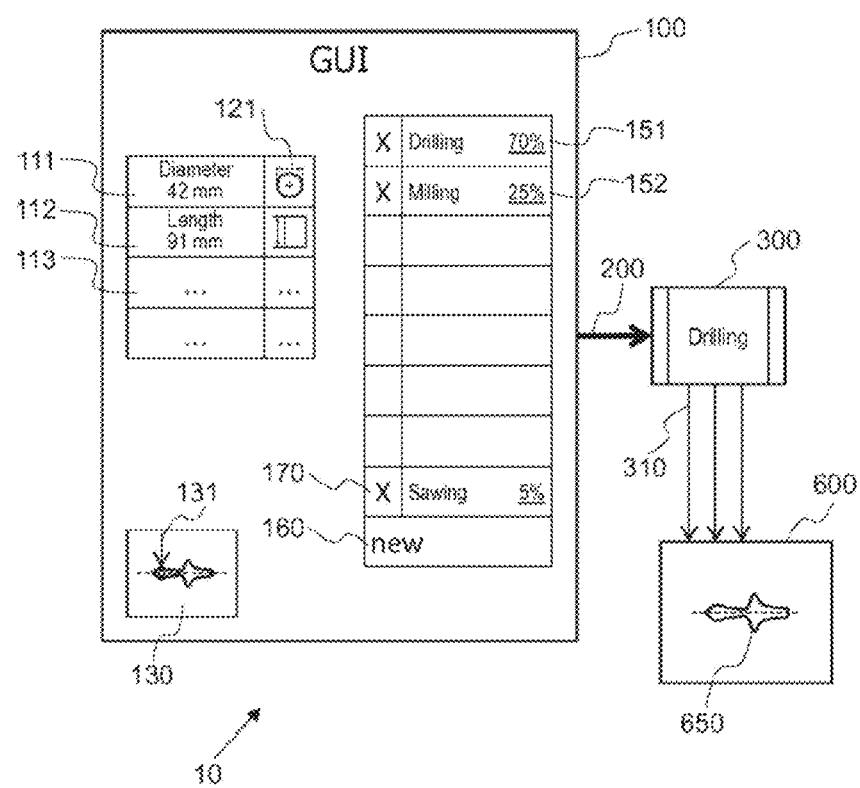
FIG. 3 shows a schematic view of the system, after selecting a process action.
Figure 4:
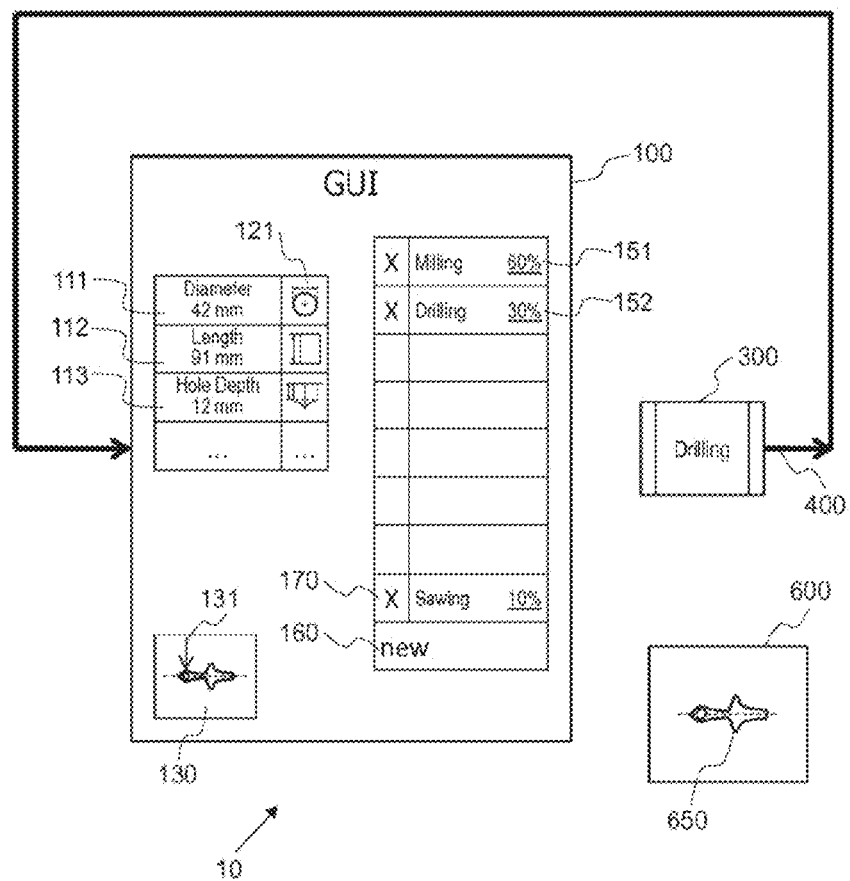
FIG. 4 shows a schematic view of the system, after the execution of a process action, and looping to a follow-up situation.

FIGS. 3 and 4 illustrate the effect of selecting the control element 151 corresponding to the Drilling action in the system 10. After selection of control element 151, a signal 200 representing the drilling action is provided to the interface component 300 as shown in FIG. 3. The interface component 300 performs any necessary conversions such that the output 310 of the interface component 300 can be interpreted by the system 600. While this example shows one process action being selected, transferred to the interface component 300 and subsequently executed, the present invention is not limited thereto. The system 10 may retain some or all of the selected process actions before providing it to the interface component 300, or alternatively, the interface component 300 may retain some or all of the selected process actions before providing it to the manufacturing system 600.

Instructions specified in signals 310 for performing the specified Drilling action are provided to the manufacturing system 600.

As a new n-tuple of parameters for the tool 650 is calculated based on the current n-tuple and the first transformation matrix associated with the Drilling action, the display 130 can use this new n-tuple to render the effects of the Drilling action on the tool 650. FIG. 3 shows a hole 131 formed from the Drilling action before the actual Drilling action is performed on the tool 650 by the manufacturing system 600 as a preview.

The manufacturing system 600 subsequently executes the instructions received from the interface component 300 to perform the Drilling action. FIG. 4 shows the result of the Drilling action on the tool 650. As shown, a hole on the tool 650 resulting from the Drilling action is now present.

The information presented in the display device 100 is also updated following the execution of the Drilling action. Numeral 400 indicates the transition to the next situation, which is reflected in the display device. As shown, the current parameters and process actions are updated. Additionally, while not shown, the associated matrices are also updated accordingly.

In this example, the system 10 detects that the calculated current parameters (Diameter, Length) of the n-tuple are unchanged (42 mm, 91 mm) The system 10 determines that the current n-tuple is insufficient to represent the current situation of the tool 650. Therefore, at least one new parameter is necessary to be represented. The system 10 then looks to the Drilling action to find the parameter associated with this process action. It finds an associated Hole Depth parameter with a value of 12 mm and expands the n-tuple to an n+m tuple (where m is one in this case) to include this new parameter and the new value of 12 mm. The system 10 automatically and dynamically updates the current parameters of the tool 650. The new situation can now be accurately represented by the new n+m tuple. Of course, if the user recognizes that the system requires additional parameters to define the current situation the user may also manually add a new parameter to the n-tuple without selecting a process action (not shown).

Furthermore, the update of current situation of the tool 650 triggers an update of the suggested process actions. As shown in FIG. 4, the probability levels of the process actions have changed. In the case shown here, a second Drilling action is less likely following a first Drilling action, while other standard process actions or follow-up process actions to drilling are more likely. This is reflected in FIG. 3 where the probability associated with the Drilling action has decreased from 70% to 30%, while the probabilities for the Milling and Sawing actions have increased from 25% and 5%, to 60% and 10%, respectively.

The change in probability levels for the available process actions is effected by a change in the second transformation matrix, that is, by a change of those element(s) of the second transformation matrix taking effect on the probability levels of the specific process actions when the second transformation matrix is combined with the updated current situation. As previously described, the application of the second transformation matrix to the n-tuple representing the current parameters produces a q-tuple indicating the probability levels for each of the process actions.

Figure 5:
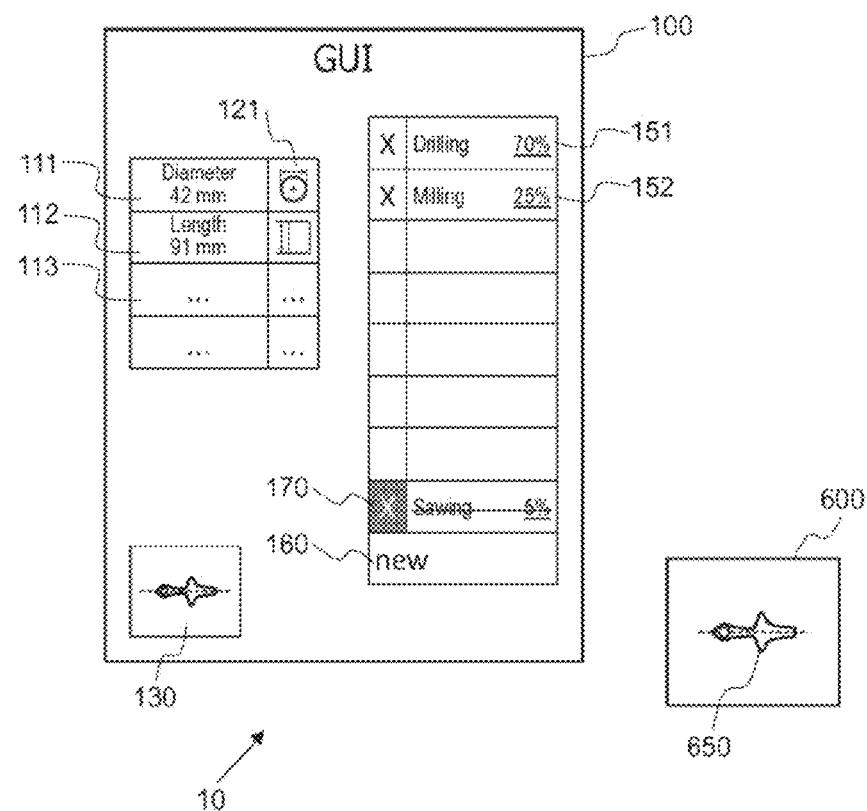
FIG. 5 shows a schematic view of the system during deletion of a process action.
Figure 6:
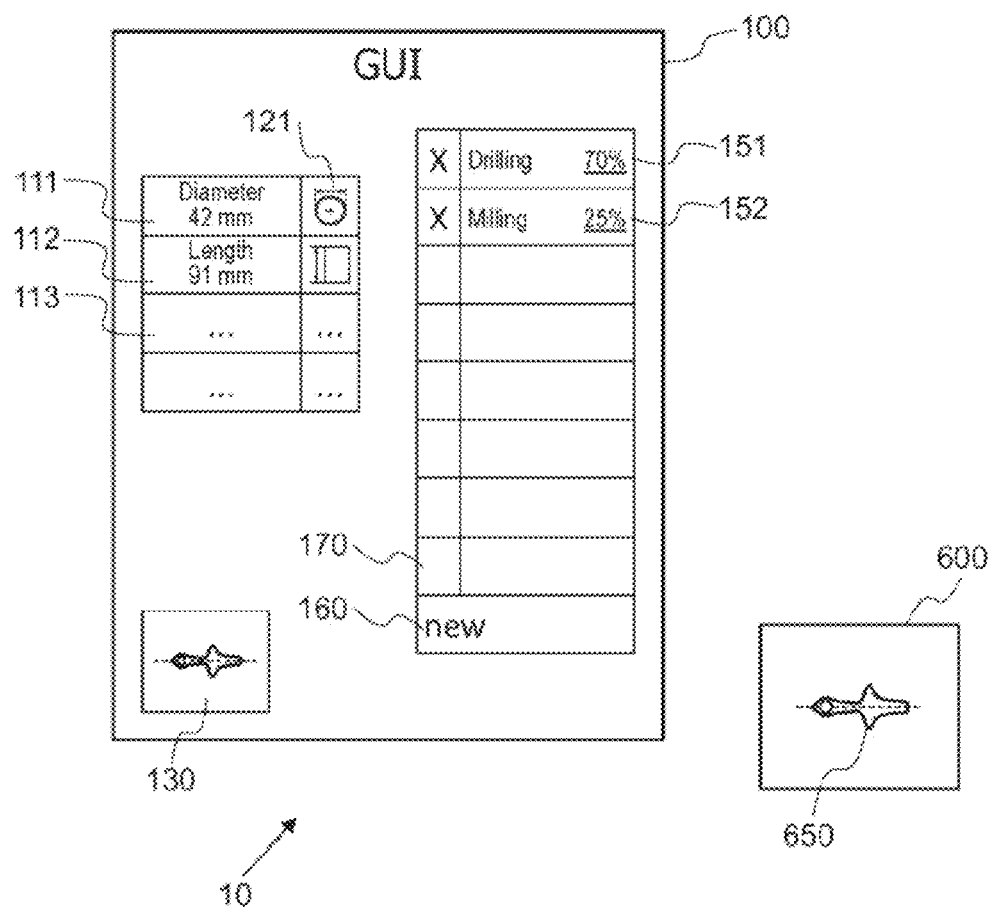
FIG. 6 shows a schematic view of the system after deletion of the process action as per FIG. 5.

With reference to FIGS. 5 and 6, an example of the operation to remove a control element of a process action is shown.

The user may feel a certain process action is no longer relevant to the manufacturing process. The system 10 provides the user with an option delete a process action. As shown in FIG. 5, an X element is displayed next to each of the control elements. In this example, the user decides to remove the Sawing action. Selecting the X element 170 next to the control element for the Sawing action causes the element to be removed.

Preferably, a message or display confirming the removal of the process action would be displayed to the user before the removal is done. In FIG. 5, the X element 170 is highlighted and the name of the process action is struck through to indicate to the user that this process action will be removed.

FIG. 6 depicts the display device 100 after the removal is completed. As shown, the control element corresponding to the Sawing action is now gone. Additionally, the probability levels of the remaining process actions are updated in the system 10. Removal of a process action causes the underlying matrices to be updated as well; the first transformation matrix associated with the Sawing action is deleted and the second transformation matrix removes the elements associated with the Sawing action and updates the values of the remaining elements. The result of removing the Sawing action that had a probability of 8% changes (typically increases) the probability levels of the Drilling and Milling actions to 76% and 24%, respectively.

It is also within the scope of the invention that one or more process actions can be made non-removable. This can be done, for example, by disabling the X element 170 associated with the process action that should not be removable by the user.

Figure 7:
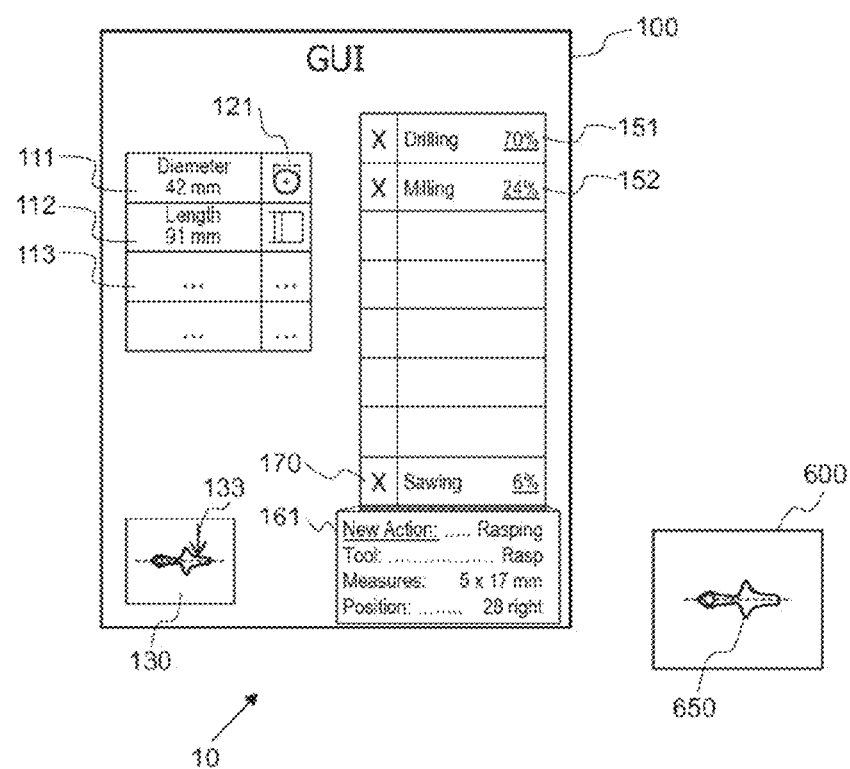
FIG. 7 shows a schematic view of the system during addition of a process action.
Figure 8:
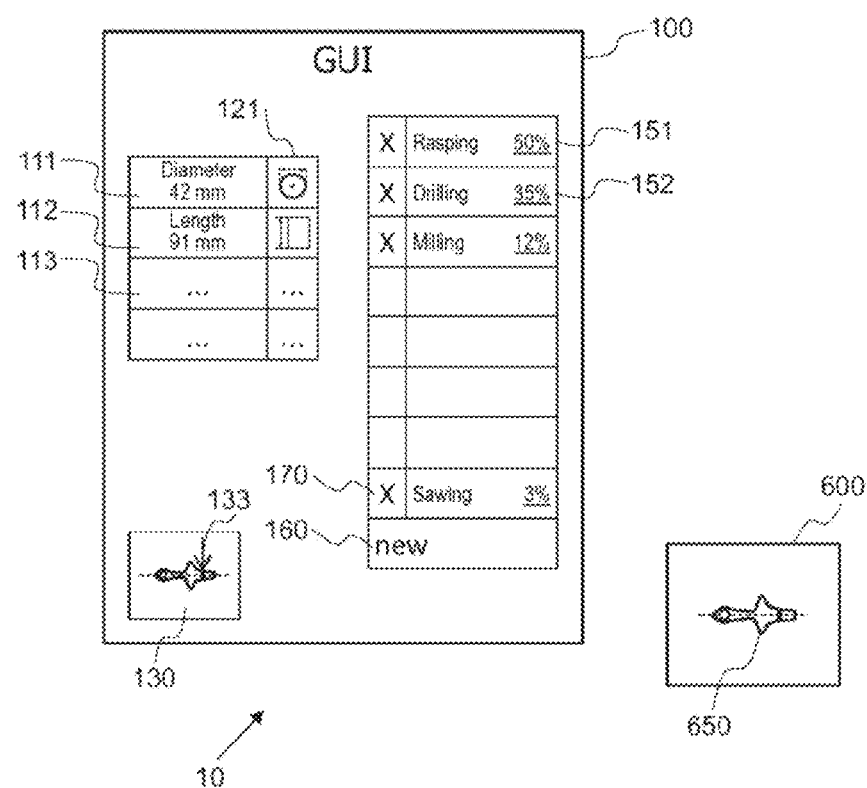
FIG. 8 shows a schematic view of the system after addition of the process action as per FIG. 7.

With reference to FIGS. 7 and 8, an example of the operation to add a new control element representing a new process action is shown.

Firstly, as shown in FIGS. 1 to 6 a control element 160 is always provided to the user by the system 10. This control element 160 is labelled New and when selected prompts the user to create a new control element representing a new process action.

Turning to FIG. 7, this view is displayed to a user after selection of the control element 160 (which is now covered by information box 161). The exemplary information box 161 shows details of a new process action called Rasping being created. This new process action may also be named automatically. It uses a Rasp tool, with measurement of the rasping being 5×17 mm and is being positioned 28 units to the right of the center position of the tool 650. In this embodiment, the position of the rasping is indicated in the display 130 by arrow 133. Additionally, information indicating which parameter this process action would affect and how it should affect the prescribed parameter can be specified here.

In a preferred embodiment, a template can be provided which suggests default values for the information to be entered. These templates may be classified under different categories and/or determined by the functions of the manufacturing system 600. Information for the new process action may be freely entered by the user or selected from a list provided by the system 600 in order to ensure that the process actions are compatible with it.

After the user is satisfied with the setup and accepts the addition, the process action is performed in accordance with the process described with respect to FIGS. 3 and 4. A new control element is created denoted by 151 in FIG. 8 for future selection. This figure further shows the new process action being selected and performed on the tool 650. The arrow denoted by 133 in the display 130 shows the location of the tool on which rasping action was performed.

The new process action may be automatically performed upon creation or the system 10 may also simply create a new control element corresponding to the new process action without executing the manufacturing action.

As in the process for removing a process action, the second transformation matrix is updated to include the new process action and the probability levels of all the process actions are updated to account for the new process action. A new first transformation matrix is also created for the new process action which when applied to the n-tuple of current parameters produces a new n-tuple of parameters to reflect the situation of the tool 650 following the process action. In the present example, the probability level of the new Rasping action is 50%. New process actions may have a default probability, such as 50% since it is likely that the new process action was created at the time it is needed. The probability levels of the other process actions are changed, typically lowered (Drilling 35%, Milling 12%, Sawing 3%) accordingly.

The present invention may allow process actions to be grouped together such that changes made to a process action in a group may affect other process actions in the group in the same manner. For example, if the rasping action were to be associated with the sawing action, when the probability level of the rasping increases, the probability of the sawing action would also increase.

The present invention also allows alternative ways to add a new control element. Rather than entering the details of the new process action, the user may choose to record a sequence of process actions or manual operations on the tool 650. If the user knows for a given tool that the process actions of Drilling, Milling and Sawing are always performed together, a new control element may be created to represent this sequence of process actions. To add this new process action, the user first selects the control element 160 showing "New" as in the previous method. An option would then be presented to the user to record a sequence of process actions. Once the option is selected, the user will then be prompted to select the process actions in the order they are to be performed. While recording, the control element 160 would show "stop" to indicate when the recording should be stopped (not shown in the figures).

Alternatively and/or additionally, the user may operate the manufacturing system 600 manually (if, for example, the listed process actions are not sufficient for the desired sequence of process actions) during recording and record these manual operations. In any event, based on the recorded sequence of process actions and/or manual operation, the system 10 completes the details of the new process action. The user can name the recorded sequence, and the new process action is added to the list of process actions. Thereafter, selection of this new control element will cause the system 10 to automatically execute the instructions of the recorded process actions. This will save the user time from selecting each process action individually and if the user cannot easily define the process action by inputting the details.

Another technique to add a new process action is similar to the above recording procedure. However, instead of recording each process action taken by the manufacturing system 600 on the tool 650, this technique determines the details of the new process action by comparing the n-tuple at the time of recording with the n-tuple at the time of stoppage of the recording. The difference between the two n-tuples would determine what details are necessary in the new process action, as well as what first transformation matrix should be associated with the process action in order to transform the first n-tuple into the second n-tuple. This technique is especially useful when the user is not sure what details to enter for the new process action, and takes advantage of the use of the tuple and matrix structure of the system 10.

In comparison to the full recording process, the system can optimize the operation of the new process action, since it knows the final result to be achieved. For example, if a recorded sequence consists of drilling a circular hole and then sawing the tool 650 such that one half of the hole is discarded, the present technique could instead perform the sawing action and then drilling a half of the circular hole on the resulting tool 650. This would save the time and energy consumption for drilling the other half of the hole which would have been discarded.

Given the flexible nature of the system 10, where the user may be free to create any process action, the system 10 provides a mechanism for removing redundant process actions that may be inadvertently created. This mechanism is able to determine a duplicate process action by comparing the first transformation matrices of each process action. The same transformation matrix means the current n-tuple will be transformed in the same manner and represent identical operations, even if the name of the process action may differ. Once identified, one or more of the redundant process actions are removed according to the process described with respect to FIGS. 5 and 6. In essence, the redundant process actions are folded into a single process action. This serves to optimize the performance and storage requirements of the system 10 and to avoid confusing the user. In a further embodiment of this invention, the user is asked if there are differences between these two process actions; in the case where there is a difference, the respective differences may be added manually.

Generally, the user initiates the above-described operations. However, the present invention also includes the possibility of these operations being triggered by signals external to the system 10. The system 10 has one or more additional sensing means for detecting any number of external conditions. Preferably, the external condition is a timing condition. In one embodiment, the detection of the current parameters of the tool 650 is initiated by a timing condition being met. For example, the sensing may be performed every 10 seconds to update the current parameters. In another aspect, the selection of a process action may be triggered by the timing condition.

The external condition could also help the system determine the occurrence of an error. In particular, if an operation has exceeded a fixed amount of time, this may indicate the occurrence of an error in the system 600 or tool 650 and the manufacturing process may be cancelled as a result. This time-out condition could also be used in an embodiment that automatically attempts to correct inaccuracies. In a preferred embodiment, after a process action is performed on the tool 650, the sensor 670 detects the current parameters of the tool 650. This n-tuple of current parameters is compared with the calculated n-tuple from the last iteration, which represents what the n-tuple of the tool 650 should be. If these tuples match, this signifies that the process action was performed accurately and successfully. If a discrepancy arises between these two tuples however, it means there was an inaccuracy in the process action being performed. The system 10 can determine whether a pre-defined follow-up process action may be taken given the discrepancy. If a follow-up situation is defined, it may proceed to perform this process action automatically until the sensed parameters meet the calculated ones or if a time-out condition is detected, in which case the manufacturing process may be terminated. An example of such operation would be a drilling operation to be selected for creating a hole of depth 10 mm. If the detected parameter of the tool is 9.5 mm, the system can determine to perform a further drilling action of 0.5 mm to create a hole of depth 10 mm. This continues until either the hole has a depth of 10 mm or if the hole somehow exceeds a depth of 10 mm, in which the operation would time-out if no further process action can be taken to reduce the depth.

The above description is largely described with respect to a process and method for controlling the manufacture of a product. The present invention is also directed to the process control system 10 that has the means for performing all of the aforementioned processes, as well as the conventionally known means for use in typical process control systems.

In view of the above, the present invention solves a number of problems with the prior art. Since the sensor 670 of the manufacturing system 600 senses the parameters of the tool 650, conceivably, starting work pieces of any form can be used. This allows greater flexibility in the manufacturing process. For example, if starting work pieces typically belong to one of several groups, with each group having different starting steps, the present system can pre-process the work pieces ahead of time for each of these groups. When a product from one of these groups is selected, the starting work piece with the pre-processing of that group could be used, saving time for manufacturing the product and allowing the steps to be decoupled from a single process. Thus, it is not necessary to perform all of the manufacturing steps in a single pass.

Additionally, by presenting the user with recommendations and displaying the probability levels of the available process actions, new users can have a greater insight on the common operations and sequences of operations in the field of the respective manufacturing process. Perhaps not completely eliminating the need for a help service, this would serve to reduce problems for new users.

The structure of the present invention allows the user to define his/her own process actions. This is incredibly powerful for the user, who is no longer restricted by the available functions and has to work around such restrictions of the conventional systems. Newly added process actions are integrated into the system and are trained by the system as they are being used. Thus, it does not require the user to have to define the properties of the process actions ahead of time. Additionally, allowing the user to add process actions in different manners allow the user flexibility on how a process action can be defined.

Moreover, disclosed systems can more reliably detect any inconsistencies and errors with the product by comparing the expected calculated parameters of the tool with the sensed actual parameters of the tool.

While various embodiments of the invention have been shown and described, the description is to be considered as illustrative rather than restrictive. The scope of the invention is as indicated in the following claims and all equivalent methods and apparatuses.

The invention claimed is:

1. A method for controlling a production process of a product by a system (600), the system being linked to a process control system for controlling the system, the method comprising the steps:
   a) determining a first n-tuple representative of current parameters of the product;
   b) retaining the first n-tuple in a memory of the process control system;
   c) displaying the product having the current parameters on a display device (100) of the process control system (10);
   d) displaying on the display device control elements for selecting from a plurality of pre-defined process actions that are compatible to be performed on the product having the current parameters as retained in the first n-tuple, each pre-defined process action being representative of a first transformation matrix having matrix elements of a dimension that is compatible with the first n-tuple, the pre-defined process action and corresponding first transformation matrices being retained in the memory of the process control system;
   e) selecting at least one selected process action from the plurality of pre-defined process actions;
   f) applying the first transformation matrix corresponding to the selected process action to the first n-tuple to produce a second n-tuple of future parameters of the product and displaying the product having the future parameters of the second n-tuple on the display device of the process control system;
   g) providing instructions representative of the matrix elements in the first transformation matrix of the selected process action to the system for performing a process step on the product corresponding to the process action, and
   h) repeating the steps a) to g).

2. The method of claim 1, further comprising
   c+applying a second transformation matrix to the first n-tuple to produce a q-tuple determining probability levels of each of the pre-defined process actions for application to the product having the current parameters as retained in the first n-tuple, wherein q is a number of pre-defined process actions, and wherein the control elements displayed on the display device are sorted according to the probability level of corresponding ones of the pre-defined process actions defined in the q-tuple, the second transformation matrix being retained in the memory of the process control system.

3. The method of claim 2, further comprising:
   g+modifying the second transformation matrix, wherein the q-tuple produced by the modified second transformation matrix has lowered probability levels for non-selected process actions and an increased probability level for the selected process action for application to the product having the current parameters as retained in the first n-tuple.

4. The method of claim 2, wherein step d) further comprises displaying on the display device a control element for adding a new process action, the new process action being representative of a new first transformation matrix of a dimension that is compatible with the first n-tuple and updating one or more of the pre-defined process actions retained in the memory of the process control system to include the new process action and the new first transformation matrix, wherein the second transformation matrix is modified to include elements for indicating also the probability level of the new process action for application to the product having the current parameters as retained in the first n-tuple.

5. The method of claim 4, wherein the new process action is added based on a pre-defined template of modifiable action steps.

6. The method of claim 2, wherein, if the second n-tuple is identical to the first n- tuple, the second n-tuple is modified to an n+m tuple, wherein m is representative of a number of new parameters added by the selected process action, and wherein the first transformation matrices for each of the one or more pre-defined process actions and the second transformation matrix are updated to be of a dimension that is compatible with the n+m tuple.

7. The method of claim 2, wherein step d) further comprises displaying on the display device a control element for deleting one of the pre-defined process actions (deleted process action) and updating the one or more pre-defined process actions retained in the memory of the process control system to remove the process action to be deleted and the first transformation matrix, wherein the second transformation matrix is modified to remove elements for indicating the probability level of the deleted process action for application to the product having the current parameters as retained in the first n-tuple.

8. The method of claim 2, wherein ones of the pre-defined process actions with a probability level below a first threshold are not displayed and/or with a probability level below a second threshold are de-activated and/or with a probability level above a third threshold are activated and/or with a probability level above a fourth threshold are highlighted in a display of the control elements on said display device for selecting from the one or more pre-defined process actions.

9. The method of claim 1, wherein one or more of the at least one selected process actions are recorded in a sequence for automatic execution thereof by the process control system.

10. The method of claim 1, further comprising determining system-external conditions and the determining or selection of step e) is automatically executed or the process is terminated by the process control system based on determination of the external condition.

11. The method of claim 10, wherein the system-external condition is a timing condition.

12. The method of claim 1, further comprising:
   a+following determination of step a) of the first n-tuple, comparing the first n-tuple with the second n-tuple a previous iteration, wherein, if the first n-tuple differs from the second n-tuple, automatically performing steps e) to f) by selecting a pre-determined process action.

13. The method of claim 2, wherein two or more process actions being representative of identical transformation matrices are folded to one process action representative of one first transformation matrix to remove one or more redundant process actions, wherein the second transformation matrix is modified to remove the elements for indicating the probability level of the one or more redundant process actions, and updating the one or more pre-defined process actions retained in the memory of the process control system (10) to remove said one or more redundant process actions.

14. The method of claim 1, further comprising logging the first n-tuple, second n-tuple, first transformation matrix, second transformation matrix and/or probability levels of the one or more pre-defined process actions for each repetition of the steps a) to g).

15. The method of claim 1, wherein the system is a simulation device of a production system.

16. A process control system (10) for controlling-a production process of a product (650) linked to a system (600) and for controlling said system (600), the process control system (10) comprising:
- an input device for determining a first n-tuple representative of current parameters of the product (650);
- a memory for retaining the first n-tuple;
- a display device (130) for displaying the product (650) having the current parameters;
- the display device displays control elements (151, 152) for selecting at least one selected process action from a plurality of pre-defined process actions that are compatible to be performed on the product (650) having the current parameters as retained in the first n-tuple, each of the pre-defined process actions being representative of a first transformation matrix having matrix elements of a dimension that is compatible with the first n-tuple, the process action and their corresponding first transformation matrices being retained in the memory of the process control system (10);
- a matrix application device for applying the first transformation matrix corresponding to the selected process action to the first n- tuple to produce a second n-tuple of future parameters of the product (650) and displaying (130) the product (650) having the future parameters of the second n-tuple on the display device (100) of the process control system (10); and
- a device for providing instructions (310) representative of the matrix elements in the first transformation matrix of the selected process action to the system (600) for performing a process step on the product (650) corresponding to the process action.

17. The process control system of claim 16, wherein the input device comprises a scanning sensor, a 3D laser scanning device, or a computer input component.

* * * * *